US011736032B1

(12) United States Patent
Patole et al.

(10) Patent No.: US 11,736,032 B1
(45) Date of Patent: Aug. 22, 2023

(54) ELECTRONIC DEVICE WITH FREQUENCY DITHERING

(71) Applicant: Apple Inc., Cupertino, CA (US)

(72) Inventors: Sujeet Milind Patole, Cupertino, CA (US); Cheung-Wei Lam, Mountain View, CA (US); Mahmoud N Mahmoud, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/164,291

(22) Filed: Feb. 3, 2023

Related U.S. Application Data (60) Provisional application No. 63/402,242, filed on Aug. 30, 2022.

(51) Int. Cl.
*H02M 7/48* (2007.01)
*H02M 1/12* (2006.01)
*H02M 7/529* (2006.01)
*H02M 1/00* (2006.01)

(52) U.S. Cl.
CPC ....... *H02M 7/4803* (2021.05); *H02M 1/0041* (2021.05); *H02M 1/12* (2013.01); *H02M 7/529* (2013.01)

(58) Field of Classification Search
CPC .... H02M 1/0041; H02M 1/12; H02M 7/4803; H02M 7/529
See application file for complete search history.

(56) References Cited

U.S. PATENT DOCUMENTS

| 5,012,400 A | * | 4/1991 | Yasuda | H02M 7/48 363/39 |
| 6,462,705 B1 | * | 10/2002 | McEwan | G01S 13/0209 342/134 |
| 2020/0350769 A1 | * | 11/2020 | Mackensen | F03D 7/043 |

OTHER PUBLICATIONS

Chaiyan Jettanasen et al., The Conducted Emission Attenuation of Micro-Inverters for Nanogrid Systems, Sustainability 2020, Dec. 23, 2019, pp. 1-32, MDPI.
Keith Hardin et al., Investigation Into the Interference Potential of Spread-Spectrum Clock Generation to Broadband Digital Communications, IEEE Transactions on Electromagnetic Compatibility, Feb. 2003, pp. 10-21, vol. 45, No. 1, IEEE.

* cited by examiner

*Primary Examiner* — Jue Zhang
(74) *Attorney, Agent, or Firm* — Treyz Law Group, P.C.; Joseph F. Guihan (57) ABSTRACT

An electronic device may include an inverter. The inverter may convert direct current (DC) power to alternating current (AC) power. The inverter may use a clock signal at a given frequency to output corresponding alternating current signals at the given frequency. The inverter may receive a dithered clock signal that is frequency dithered using a modulating signal. The dithered clock signal may have at least three different frequency levels during a repeated cycle of the modulating signal. The at least three different frequency levels may include a fundamental frequency, a first frequency that is lower than the fundamental frequency, and a second frequency that is higher than the fundamental frequency. The dithered clock signal may be, during the repeated cycle of the modulating signal, at the fundamental frequency for fewer total periods than at the first frequency and for fewer total periods than at the second frequency.

21 Claims, 7 Drawing Sheets

ELECTRONIC DEVICE WITH FREQUENCY DITHERING

This application claims the benefit of provisional patent application No. 63/402,242, filed Aug. 30, 2022, which is hereby incorporated by reference herein in its entirety.

Field

This relates generally to electronic devices, and, more particularly, to electronic devices with inverters.

Background

Electronic devices sometimes include inverters that convert direct current (DC) power to alternating current (AC) power. The inverter may use a clock signal at a given frequency to output corresponding alternating current signals. If care is not taken, operation of the inverter may cause greater electromagnetic interference (EMI) than desired.

Summary

An electronic device may include an inverter configured to receive a dithered clock signal and output corresponding alternating current signals and control circuitry configured to obtain the dithered clock signal using a modulating signal and a clock signal. The dithered clock signal may have at least three different frequency levels during a repeated cycle of the modulating signal. The at least three different frequency levels may include a fundamental frequency, a first frequency that is lower than the fundamental frequency, and a second frequency that is higher than the fundamental frequency. The dithered clock signal may be, during the repeated cycle of the modulating signal, at the fundamental frequency for fewer total periods than at the first frequency and for fewer total periods than at the second frequency.

DETAILED DESCRIPTION

Figure 1:
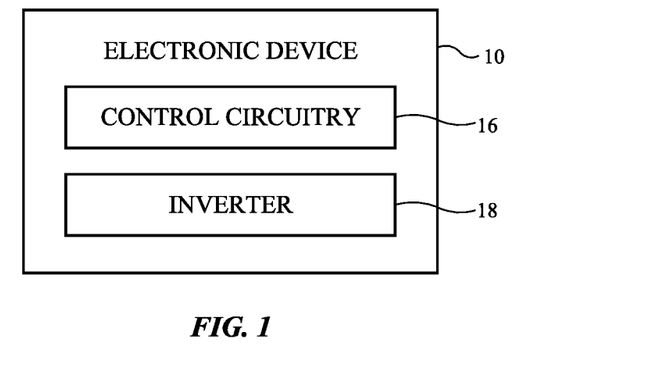
FIG. 1 is a schematic diagram of an illustrative electronic device in accordance with some embodiments.

An illustrative electronic device of the type that may be provided with an inverter is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment is mounted in a kiosk or automobile, power adapter, dock, or other electronic equipment and/or accessories. Electronic device 10 may be capable of wireless charging (e.g., transmitting and/or receiving wireless power). Any of the aforementioned electronic devices may include a wireless power transfer coil, or wireless charging coil, for transmitting and/or receiving wireless power (as an example). As additional examples, electronic device 10 may be a wireless charging mat or a wireless charging puck, may be equipment that has been incorporated into furniture, a vehicle, or other system, may be a removable battery case (e.g., for a cellular telephone, tablet computer, earbuds, etc.), or may be other wireless power transfer equipment.

As shown in FIG. 1, electronic device 10 may include control circuitry 16 for supporting the operation of device 10. This control circuitry may include processing circuitry associated with microprocessors, power management units, baseband processors, digital signal processors, microcontrollers, and/or application-specific integrated circuits with processing circuits. The processing circuitry implements desired control and communications features in electronic device 10. For example, the processing circuitry may be used in processing user input, handling negotiations between electronic device and external electronic devices, sending and receiving data (e.g., in-band data transmitted or received during wireless power transfer using a wireless charging coil, data transmitted or received using an antenna, etc.), making measurements, estimating power losses, determining power transmission levels, and otherwise controlling the operation of electronic device 10.

Control circuitry in electronic device 10 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 16. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16. The processing circuitry may include application-specific integrated circuits with processing circuitry, one or more microprocessors, a central processing unit (CPU) or other processing circuitry.

As shown in FIG. 1, electronic device also includes an inverter 18. Inverter 18 may convert direct current (DC) power to alternating current (AC) power. The inverter 18 may use a clock signal at a given frequency to output corresponding alternating current signals at the given frequency.

Figure 2:
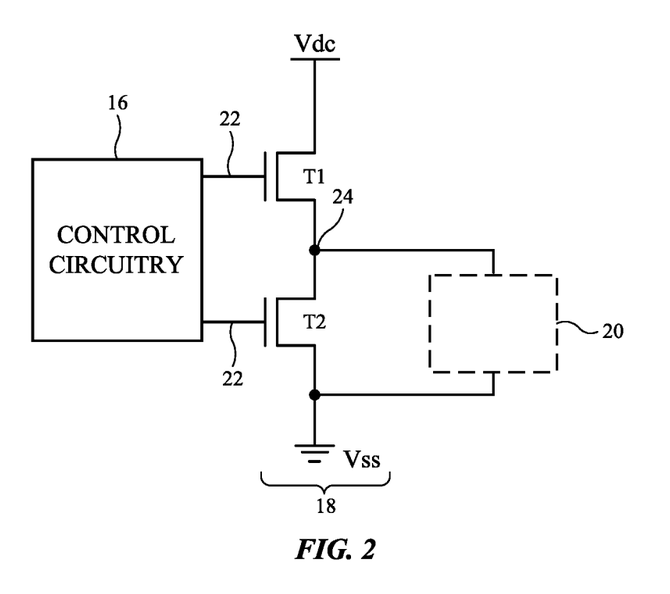
FIG. 2 is a schematic diagram of an illustrative inverter in accordance with some embodiments.

FIG. 2 is a diagram of an illustrative inverter 18 in electronic device 10. As shown in FIG. 2, inverter 18 may receive a DC voltage Vdc (e.g., from an AC-DC converter, a battery, etc.). Inverter 18 includes transistors T1 and T2. Each transistor (T1 and T2) has a respective gate 22. Transistors T1 and T2 are coupled in series between a positive voltage terminal (at positive power supply voltage Vdc) and a ground voltage terminal (at ground power supply voltage Vss, sometimes referred to simply as ground voltage Vss).

Control circuitry 16 may produce control signals that are applied to gate terminals 22 of inverter transistors T1 and T2. Gates 22 of transistors T1 and T2 may receive complementary signals so that the gate of transistor T1 is high when the gate of transistor T2 is low, and vice versa. In other words, transistors T1 and T2 are asserted in a mutually exclusive fashion, with T2 being deasserted while T1 is asserted and vice versa.

With one illustrative configuration, transistors T1 and T2 may be supplied with an AC signal (e.g., a clock signal) at a suitable operating frequency with a desired pulse width (or duty cycle) to control the amount of power being transmitted. Exemplary frequencies include 100-200 kHz, 200-300 kHz, 300-400 kHz, 1.778 MHz, 13.56 MHz, 6.78 GHz, so forth. In general, control signals may be applied to T1 and T2 at any desired frequency.

A component 20 may be coupled between node 24 and the ground power supply terminal Vss. Node 24 is interposed between T1 and T2 and may sometimes be referred to as an output node or output of inverter 18. As the control signals are applied to gates 22 of transistors T1 and T2, the DC voltage Vdc is converted into alternating current signals that pass through component 20.

Component 20 may be a wireless charging coil, a transformer coil, an antenna, or any other desired component. Consider the example where component 20 is a wireless charging coil. As the control signals are applied to gates 22 of transistors T1 and T2, the DC voltage Vdc is converted into AC signals that passes through wireless charging coil 20, which produces wireless power signals that may be received by a wireless charging coil in a corresponding electronic device. The wireless charging coil may be connected (e.g., in series between node 24 and ground power supply terminal Vss) to a resonance capacitor that is tuned to a fundamental frequency f0.

Some electronic devices with inverters may employ signal dithering to improve electromagnetic emission characteristics of the system (e.g., to reduce conducted emission and/or radiated emission). For example, electronic device 10 may dither the clock signal that is used to control inverter 18. This effectively dithers the frequency of the alternating current signals output by inverter 18.

Herein, various signals (e.g., clock signals) may be referred to as having corresponding waveforms (e.g., the shape of the voltage of the signal over time). A given waveform may have a recurring shape that repeats at a given frequency (i.e., the given waveform may be periodic). The recurring shape need not necessarily be a regular shape (e.g., a sinusoid). Indeed, the recurring shape may deviate from a sinusoidal shape. However, this type of waveform may still have a frequency associated with the periodic repeating of the non-sinusoidal shape.

Figure 3:
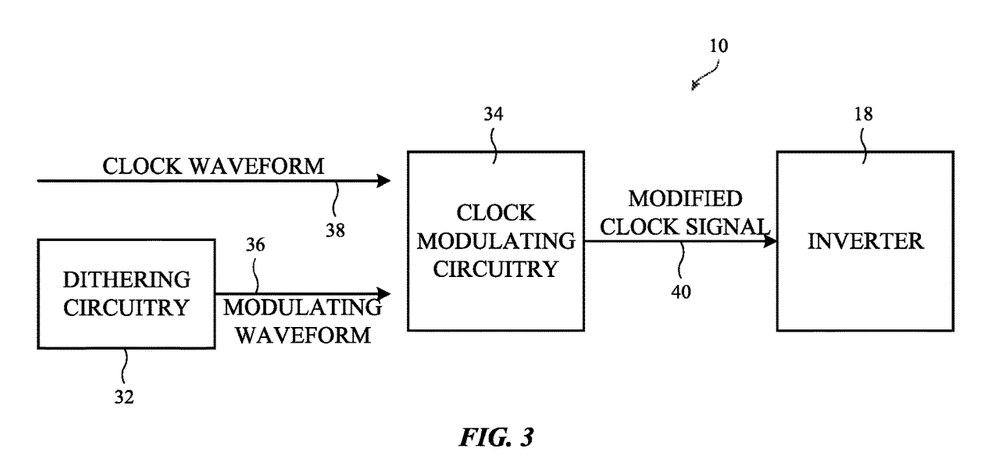
FIG. 3 is a schematic diagram of an illustrative electronic device that includes dithering circuitry in accordance with some embodiments.

FIG. 3 is a diagram of an illustrative electronic device 10 with dithering circuitry. In one possible arrangement, dithering circuitry 32 and clock modulating circuitry 34 may be used to implement a spread spectrum clocking technique (sometimes referred to as clock dithering). In spread spectrum clocking, a clock waveform is intentionally modified such that the signal's spectrum is spread around the target frequency for the clock signal. This target frequency is sometimes referred to as the fundamental frequency for the clock signal. This reduces the EMI associated with the target frequency of the clock signal, such as emissions at harmonics of the target frequency.

As previously mentioned, a clock signal may be provided to inverter 18 at a given frequency to cause transistors in the inverter circuitry to turn on and off to create AC signals (also at the given frequency) through a component.

Electronic device 10 may include dithering circuitry 32 and clock modulating circuitry 34 that is used to perform frequency dithering operations. Dithering circuitry 32 and clock modulating circuitry 34 may be considered part of control circuitry 16.

Dithering circuitry 32 may determine a modulating waveform 36 that is used to modulate the clock waveform 38 (sometimes referred to as native clock waveform 38, initial clock waveform 38, undithered clock waveform 38, system clock 38, etc.). To mitigate EMI in electronic device 10, modulating waveform 36 is applied to clock waveform 38 by clock modulating circuitry 34. Clock modulating circuitry 34 may use modulating waveform 36 to frequency modulate clock waveform 38. The resulting modified clock signal 40 is then provided to inverter 18 to create frequency dithered AC signals.

Figure 4:
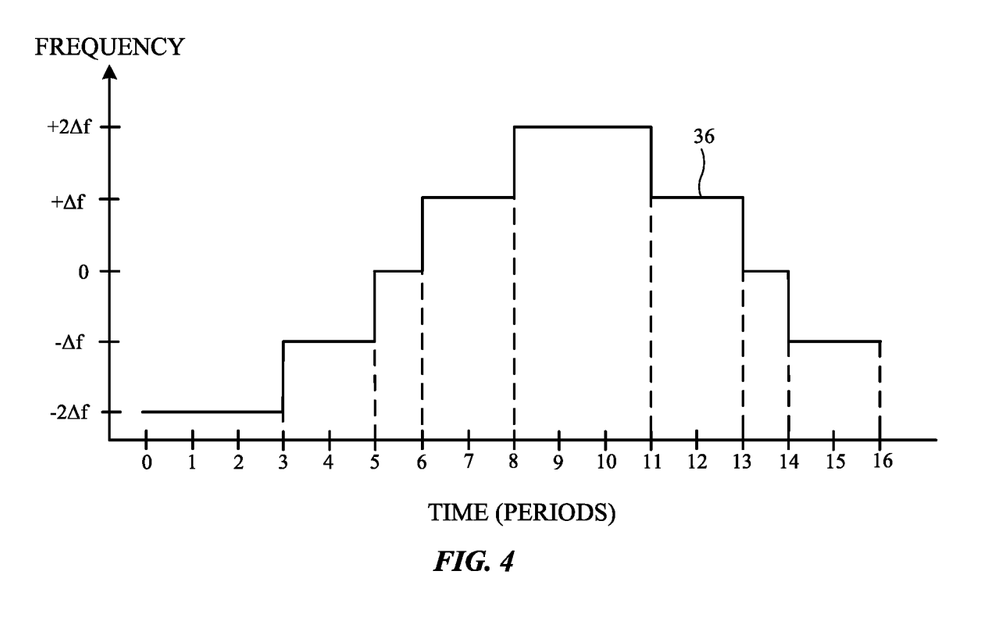
FIG. 4 is a graph of an illustrative modulating waveform that may be used for frequency dithering in an electronic device in accordance with some embodiments.

FIG. 4 is a graph of an illustrative modulating signal 36 that may be used for frequency dithering. FIG. 4 shows the frequency over time for modulating signal 36. In FIG. 4, the modulating signal 36 follows a step function with various levels (e.g., at $-2\Delta f$, $-\Delta f$, $0$, $\Delta f$, and $+2\Delta f$). The modulating signal is used to frequency modulate (dither) the system clock signal so that the output of the inverter is frequency dithered. For simplicity, FIG. 4 shows the time axis in units of periods. Each period is a single period for the clock signal that is modulated using modulating signal 36. In the example of FIG. 4, the modulating signal 36 has a frequency of $-2\Delta f$ for three periods of the clock signal, then a frequency of $-\Delta f$ for two periods of the clock signal, then a frequency of 0 for one period of the clock signal, then a frequency of $+\Delta f$ for two periods of the clock signal, then a frequency of $+2\Delta f$ for three periods of the clock signal, then a frequency of $+\Delta f$ for two periods of the clock signal, then a frequency of 0 for one period of the clock signal, then a frequency of $-\Delta f$ for two periods of the clock signal. The modulating signal therefore includes a total of 16 periods of the clock signal in a given cycle. The modulating signal may repeat the cycle depicted in FIG. 4.

Figure 5:
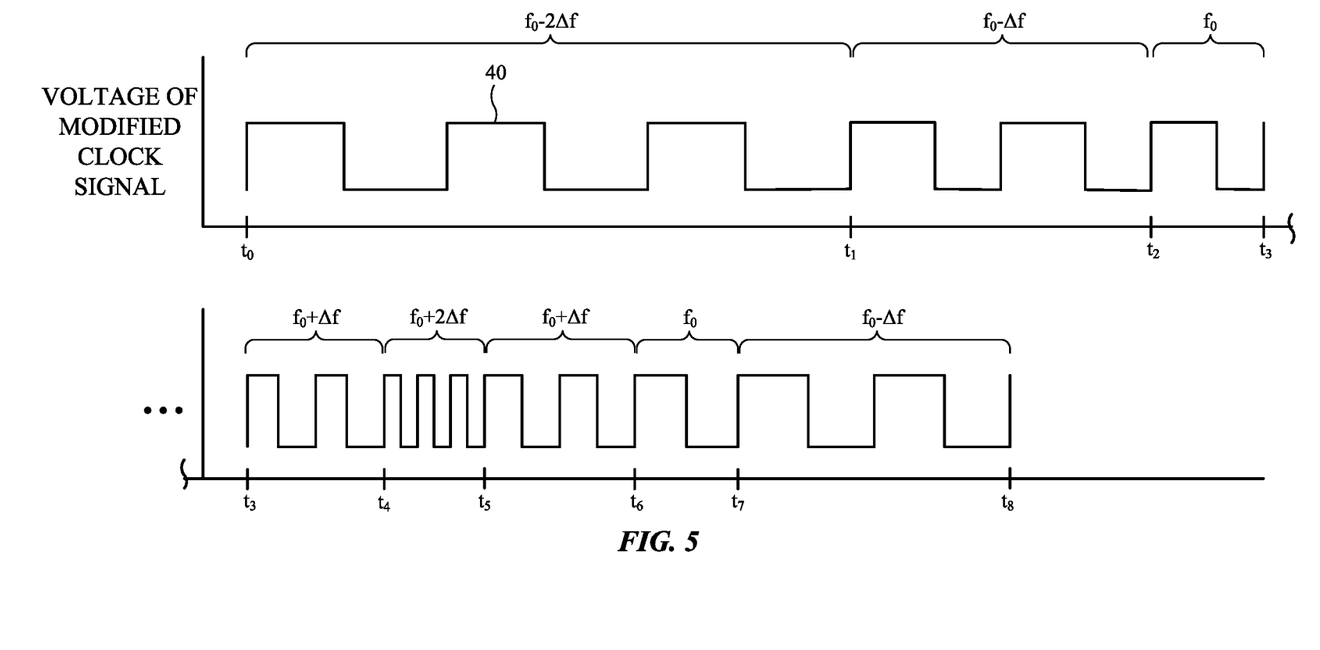
FIG. 5 is a graph of an illustrative modified clock signal that is frequency dithered using the modulating waveform of FIG. 4 in accordance with some embodiments.

The modulating signal 36 may cause deviations of the modified clock signal 40 from a fundamental frequency f0 (e.g., 1.778 MHz). As previously mentioned, a component connected to the inverter output such as a wireless charging coil may be tuned to the fundamental frequency (e.g., using a capacitor). The waveform of modified clock signal 40 (after modulation using modulating signal 36 from FIG. 4) is shown in FIG. 5. As shown in FIG. 5, the modified clock signal 40 has a frequency of $f0-2\Delta f$ between $t_0$ and $t_1$ (e.g., for three periods), the modified clock signal 40 has a frequency of $f0-\Delta f$ between $t_1$ and $t_2$ (e.g., for two periods), the modified clock signal 40 has a frequency of f0 between $t_2$ and $t_3$ (e.g., for one period), the modified clock signal 40 has a frequency of $f0+\Delta f$ between $t_3$ and $t_4$ (e.g., for two periods), the modified clock signal 40 has a frequency of f0+2Δf between $t_4$ and $t_5$ (e.g., for three periods), the modified clock signal 40 has a frequency of f0+Δf between $t_5$ and $t_6$ (e.g., for two periods), the modified clock signal 40 has a frequency of f0 between $t_6$ and $t_7$ (e.g., for one period), the modified clock signal 40 has a frequency of f0−Δf between $t_7$ and $t_8$ (e.g., for two periods).

As shown in the example of FIG. 5, the inverter may operate with a duty cycle of 50%. This example is merely illustrative, as inverters may operate with various desired duty cycles.

The modulating waveform 36 in FIG. 4 may have a corresponding modulation frequency $f_m$ and a total frequency spread. Modulation frequency $f_m$ is the frequency, also called dither pattern repetition rate, of modulating waveform 36. In other words, the modulating signal repeats the pattern of FIG. 4 at the modulation frequency, or repetition rate of, $f_m$. In FIG. 4, the modulation frequency is equal to 1 divided by the duration of the 16 periods to complete a cycle of the modulation waveform.

In general, the modulation frequency may be less than 1 MHz, less than 0.5 MHz, less than 0.2 MHz, less than 0.1 MHz, less than 0.01 MHz, greater than 1 MHz, greater than 0.5 MHz, greater than 0.2 MHz, greater than 0.1 MHz, greater than 0.01 MHz, between 0.1 MHz and 0.2 MHz, etc.

The difference between the minimum and maximum frequencies of the modulating signal may sometimes be referred to as the total frequency spread or total frequency deviation of the modulating signal. In FIG. 4, the minimum frequency is −2Δf and the maximum frequency is +2Δf. The total frequency spread is therefore 4Δf.

In general, the total frequency spread of the modulating signal may be greater than 60 kHz, greater than 100 kHz, greater than 150 kHz, greater than 500 kHz, greater than 1 MHz, greater than 10 MHz, less than 100 kHz, less than 150 kHz, less than 500 kHz, less than 1 MHz, less than 10 MHz, between 150 kHz and 160 kHz, etc.

In FIG. 4, the modulating waveform spends a given number of periods (duration) at each level of the step function. In FIG. 4, the duration of time at a given level (before progressing to the next frequency level) may vary. In FIG. 4, the number of periods per level, in order, is 3, then 2, then 1, then 2, then 3, then 2, then 1, and then 2. The number of periods at each level may be proportional (though not necessarily directly proportional) to a difference between the frequency at that level and the fundamental frequency. In other words, at the greatest difference from the fundamental frequency (e.g., at −2Δf and +2Δf), the duration is the greatest (3 periods). At the smallest deviation from the fundamental frequency (e.g., at 0 which is equal to the fundamental frequency), the duration is the smallest (1 period). At intermediate deviations from the fundamental frequency (e.g., at −Δf and +Δf), an intermediate duration is used (2 periods).

In FIG. 4, the modulating signal is adjusted between 5 total frequencies (sometimes referred to as frequency levels or frequency steps). In FIG. 4, there is a uniform difference Δf between each adjacent pair of frequency levels. This example is merely illustrative. In another possible arrangement, there may be non-uniform differences between adjacent pairs of frequency levels.

As an example, clock modulating circuitry 34 may modulate clock signal 38 by dividing the frequency of the clock signal by varying amounts (based on modulating waveform 36). As an example, a native clock signal in electronic device 10 may have a frequency of 80 MHz. The native clock signal may be divided by a predetermined scaling factor to obtain a clock signal that is used to control inverter 18. For example, a scaling factor of 45 may be used to obtain a clock signal of 1.778 MHz that is used to control inverter 18 (e.g., 80 MHz / 45=1.778 MHz).

The modulating signal 36 may be an adjustment to the predetermined scaling factor. Modulating circuitry 34 divides the native clock signal frequency by the scaling factor plus an adjustment that is obtained from the modulating signal 36. In other words, the frequency of the modified clock signal 40 may be equal to 80 MHz/(45+x), where x is the adjustment obtained from modulating signal 36.

Figure 6:
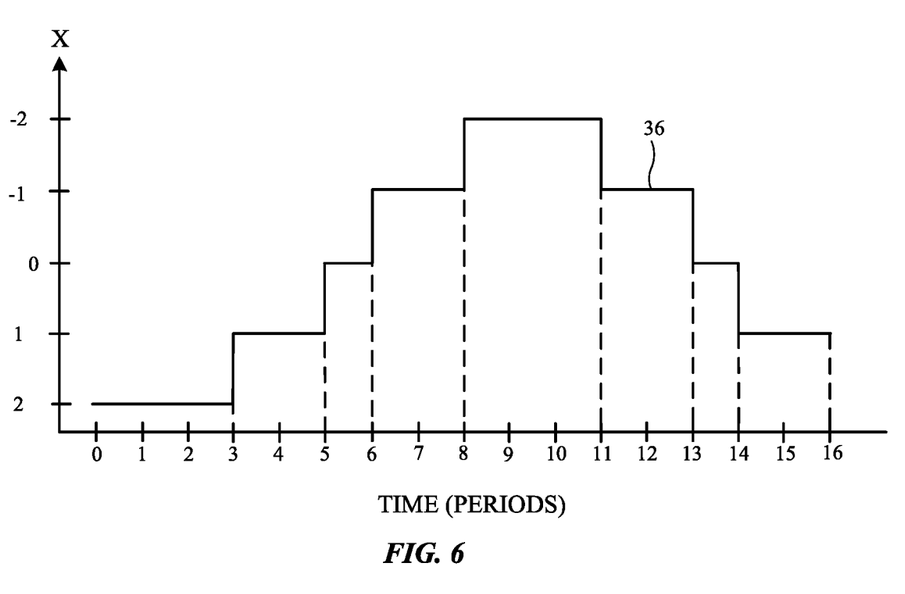
FIG. 6 is a graph of an illustrative modulating waveform that may be used for frequency dithering in an electronic device with scaling of a clock signal in accordance with some embodiments.

FIG. 6 is a graph of an illustrative modulating signal 36 that may be used for frequency dithering. FIG. 6 shows the value of x over time (in the aforementioned scaling scheme) for modulating signal 36. For simplicity, FIG. 6 shows the time axis in units of periods. Each period is a single period for the clock signal that is modulated using modulating signal 36. In the example of FIG. 6, the modulating signal 36 has a value of 2 for three periods of the clock signal, then a value of 1 for two periods of the clock signal, then a value of 0 for one period of the clock signal, then a value of −1 for two periods of the clock signal, then a value of −2 for three periods of the clock signal, then a value of −1 for two periods of the clock signal, then a value of 0 for one period of the clock signal, then a value of 1 for two periods of the clock signal.

When the modulating signal 36 has a value of 2 for x, the resulting frequency (e.g., of the modified clock signal) is equal to 80 MHz/(45+2)=1.702 MHz (sometimes referred to as f1). When the modulating signal 36 has a value of 1 for x, the resulting frequency is equal to 80 MHz/(45+1)=1.739 MHz (sometimes referred to as f2). When the modulating signal 36 has a value of 0 for x, the resulting frequency is equal to 80 MHz/(45+0)=1.778 MHz (sometimes referred to as f0). When the modulating signal 36 has a value of −1 for x, the resulting frequency is equal to 80 MHz/(45−1)=1.818 MHz (sometimes referred to as f3). When the modulating signal 36 has a value of −2 for x, the resulting frequency is equal to 80 MHz/(45−2)=1.860 MHz (sometimes referred to as f4).

The magnitudes for f1, f2, f0, f3, and f4 provided above are merely illustrative. In general, f1, f2, f0, f3, and f4 may have any desired magnitudes. In general, each one of f1, f2, f0, f3, and f4 may have magnitudes between 100 kHz and 100 MHz. As another specific example, f1 may be between 1.69 and 1.72 MHz, f2 may be between 1.72 and 1.75 MHz, f0 may be between 1.76 and 1.79 MHz, f3 may be between 1.80 and 1.83 MHz, and f4 may be between 1.84 and 1.88 MHz. Each one of f1, f2, f3, and f4 may be within 15% of f0, within 10% of f0, within 8% of f0, within 5% of f0, within 3% of f0, etc.

The modulation frequency $f_m$ of the modulation waveform of FIG. 6 is 0.111 MHz. The total frequency spread of the modulation waveform of FIG. 6 is 0.158 MHz (e.g., 1.860 MHz-1.702 MHz).

Figure 7:
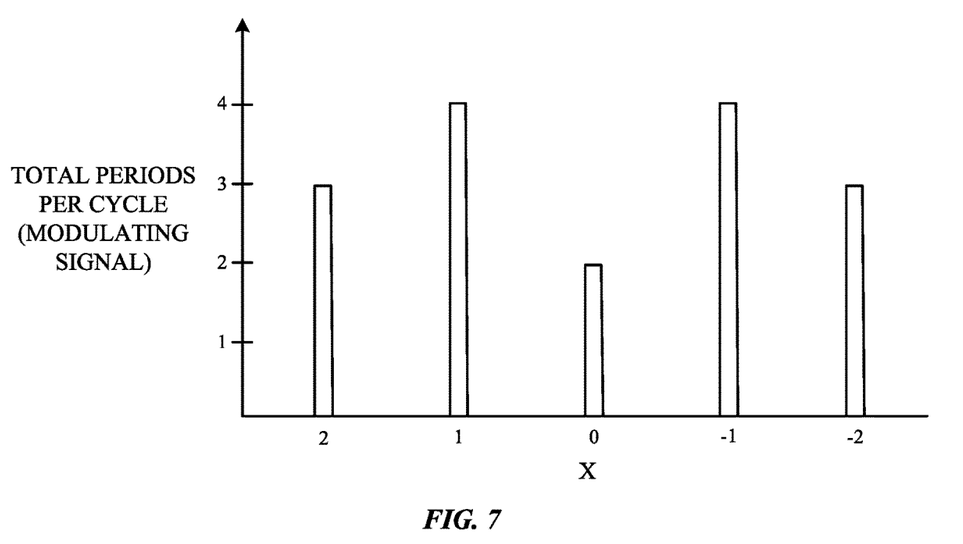
FIG. 7 is a histogram of the total periods per cycle at various values for the modulating signal of FIG. 6 in accordance with some embodiments.

FIG. 7 is a histogram of the total number of periods at each level of the modulation signal of FIG. 6 (e.g., during one cycle of the modulation signal). As shown, there are 3 total periods with a value of 2, 4 total periods with a value of 1, 2 total periods with a value of 0, 4 total periods with a value of −1, and 3 total periods with a value of −2.

Figure 8:
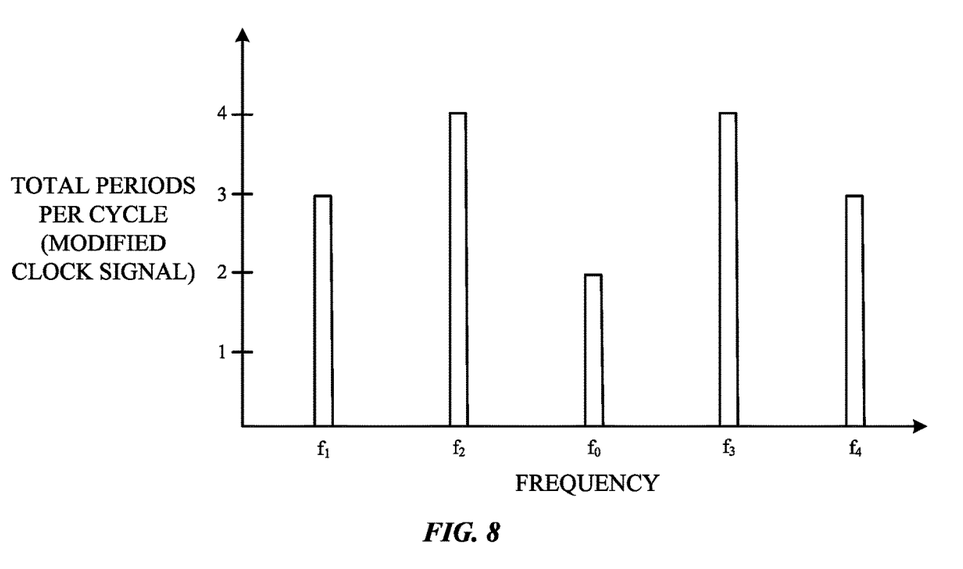
FIG. 8 is a histogram of the total periods per cycle at various frequencies for a modified clock signal that is dithered using the modulating waveform of FIG. 6 in accordance with some embodiments.

FIG. 8 is a histogram of the total number of periods at each frequency level of a modified clock signal that is modified using the modulation waveform of FIG. 6 (e.g., during one cycle of the modulation signal). As shown, there are 3 total periods with a frequency of f1, 4 total periods with a value of f2, 2 total periods with a value of f0, 4 total periods with a value of f3, and 3 total periods with a value of f4. f4 is greater than f3, which is greater than f0, which is greater than f2, which is greater than f1.

As shown in FIG. 7, the number of periods at a value of 0 (which corresponds to the modified clock signal having the fundamental frequency f0 in FIG. 8) is lower than the number of periods at any other value. The modulating signal 36 in FIGS. 4 and 6 therefore reduces the total time spent at the fundamental frequency (f0). This type of modulation scheme may reduce conducted emission (CE) at the fundamental frequency below a target threshold while also meeting occupied bandwidth (OBW) requirements, jitter requirements, and radiated emission (RE) requirements.

The example of the modified clock signal having five frequency levels (e.g., f1, f2, f0, f3, and f4 in FIG. 8) is merely illustrative. If desired, the modulating signal (and, correspondingly, the modified clock signal) may have three frequency levels, more than three frequency levels, more than five frequency levels, more than seven frequency levels etc. Regardless of the number of frequency levels, the modified clock signal may, within a given cycle of the modulating signal, spend fewer periods at the fundamental frequency than the other frequencies.

The foregoing is merely illustrative and various modifications can be made to the described embodiments. The foregoing embodiments may be implemented individually or in any combination.

What is claimed is:

1. An electronic device comprising:
   an inverter configured to receive a dithered clock signal and output corresponding alternating current signals; and
   control circuitry configured to obtain the dithered clock signal using a modulating signal and a clock signal, wherein:
   the dithered clock signal has at least three different frequency levels during a repeated cycle of the modulating signal;
   the at least three different frequency levels include a fundamental frequency, a first frequency that is lower than the fundamental frequency, and a second frequency that is higher than the fundamental frequency; and
   the dithered clock signal is, during the repeated cycle of the modulating signal, at the fundamental frequency for fewer total periods than at the first frequency and for fewer total periods than at the second frequency.

2. The electronic device defined in claim 1, wherein the dithered clock signal is at each frequency level for a respective duration of time before progressing to the subsequent frequency level and wherein the durations of time differ for at least two of the different frequency levels.

3. The electronic device defined in claim 2, wherein the durations of time for the at least two of the different frequency levels include different numbers of periods.

4. The electronic device defined in claim 2, wherein the durations of time for the frequency levels increase with increasing difference relative to the fundamental frequency.

5. The electronic device defined in claim 1, wherein the at least three different frequency levels comprise at least five different frequency levels.

6. The electronic device defined in claim 5, wherein the at least five different frequency levels comprise a third frequency that is between the first frequency and the fundamental frequency and a fourth frequency that is between the second frequency and the fundamental frequency.

7. The electronic device defined in claim 6, wherein the dithered clock signal is, during the repeated cycle of the modulating signal, at the fundamental frequency for fewer total periods than at the third frequency and for fewer total periods than at the fourth frequency.

8. The electronic device defined in claim 7, wherein the dithered clock signal is, during the repeated cycle of the modulating signal, at the first frequency for fewer total periods than at the third frequency.

9. The electronic device defined in claim 7, wherein the dithered clock signal is, during the repeated cycle of the modulating signal, at the second frequency for fewer total periods than at the fourth frequency.

10. The electronic device defined in claim 6, wherein the dithered clock signal is, during the repeated cycle of the modulating signal, at the first frequency for three periods, then at the third frequency for two periods, then at the fundamental frequency for one period, then at the fourth frequency for two periods, then at the second frequency for three periods, then at the fourth frequency for two periods, then at the fundamental frequency for one period, and then at the third frequency for two periods.

11. The electronic device defined in claim 6, wherein the first frequency is 1.702 MHz, the third frequency is 1.739 MHz, the fundamental frequency is 1.778 MHz, the fourth frequency is 1.818 MHz, and the second frequency is 1.860 MHz.

12. The electronic device defined in claim 6, wherein the repeated cycle of the modulating signal includes 16 periods of the dithered clock signal.

13. The electronic device defined in claim 1, further comprising:
   a wireless charging coil that receives the alternating current signals from the inverter.

14. A non-transitory computer-readable storage medium storing one or more programs configured to be executed by one or more processors of an electronic device that comprises an inverter configured to receive a dithered clock signal and output corresponding alternating current signals, the one or more programs including instructions for:
   obtaining the dithered clock signal using a modulating signal and a clock signal, wherein:
   the dithered clock signal has at least three different frequency levels during a repeated cycle of the modulating signal;
   the at least three different frequency levels include a fundamental frequency, a first frequency that is lower than the fundamental frequency, and a second frequency that is higher than the fundamental frequency; and
   the dithered clock signal is, during the repeated cycle of the modulating signal, at the fundamental frequency for fewer total periods than at the first frequency and for fewer total periods than at the second frequency.

15. A method of operating an electronic device that comprises an inverter configured to receive a dithered clock signal and output corresponding alternating current signals, the method comprising:
   obtaining the dithered clock signal using a modulating signal and a clock signal, wherein:
   the dithered clock signal has at least three different frequency levels during a repeated cycle of the modulating signal;
   the at least three different frequency levels include a fundamental frequency, a first frequency that is lower than the fundamental frequency, and a second frequency that is higher than the fundamental frequency; and the dithered clock signal is, during the repeated cycle of the modulating signal, at the fundamental frequency for fewer total periods than at the first frequency and for fewer total periods than at the second frequency.

16. An electronic device comprising:

an inverter configured to receive a dithered clock signal and output corresponding alternating current signals; and control circuitry configured to obtain the dithered clock signal using a modulating signal and a clock signal, wherein the modulating signal comprises, during a repeated cycle:

a first level that causes the dithered clock signal to have a fundamental frequency;

a second level that causes a decrease in frequency for the dithered clock signal relative to the fundamental frequency; and a third level that causes an increase in frequency for the dithered clock signal relative to the fundamental frequency, wherein the modulating signal is, during the repeated cycle, at the first level for fewer total periods than at the second level and for fewer total periods than at the third level.

17. The electronic device defined in claim 16, wherein the modulating signal is at each level for a respective duration of time before progressing to the subsequent level and wherein the durations of time differ for at least two of the different levels.

18. The electronic device defined in claim 17, wherein the durations of time for the at least two of the different levels include different numbers of periods for the dithered clock signal.

19. The electronic device defined in claim 17, wherein the durations of time for the levels increase with increasing change in frequency relative to the fundamental frequency caused for the dithered clock signal.

20. The electronic device defined in claim 16, wherein the increase in frequency is a first increase in frequency, wherein the decrease in frequency is a first decrease in frequency, wherein the modulating signal comprises a fourth level that causes a second decrease in frequency for the dithered clock signal relative to the fundamental frequency that is less than the first decrease in frequency, and wherein the modulating signal comprises a fifth level that causes a second increase in frequency for the dithered clock signal relative to the fundamental frequency that is less than the first increase in frequency.

21. The electronic device defined in claim 20, wherein the modulating signal is, during the repeated cycle, at the second level for three periods, then at the fourth level for two periods, then at the first level for one period, then at the fifth level for two periods, then at the third level for three periods, then at the fifth level for two periods, then at the first level for one period, and then at the fourth level for two periods.

* * * * *